July 17, 1928.
W. N. GITTINGS
AUTOMATIC SWITCHING SYSTEM
Filed Dec. 23, 1927
1,677,715
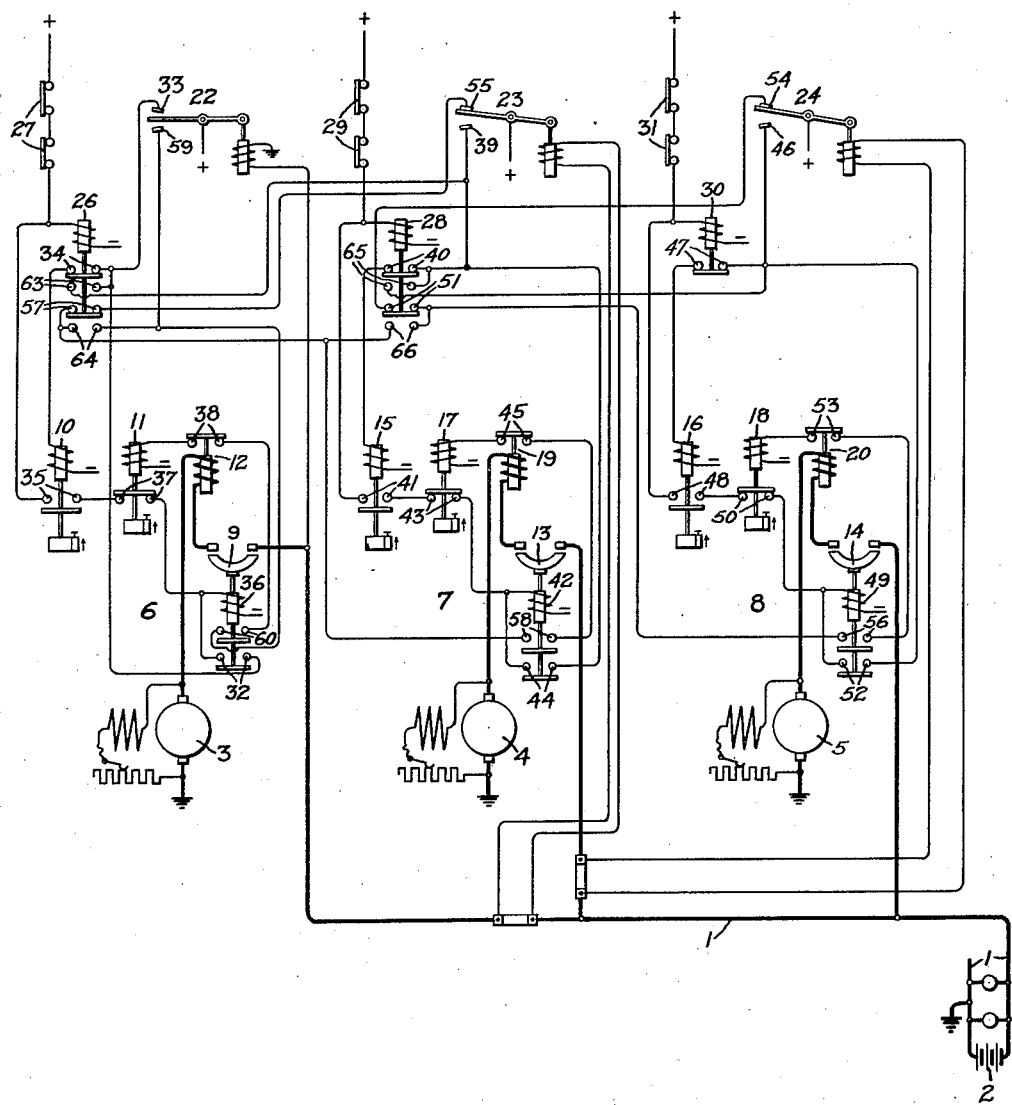
Inventor:
William N. Gittings,
by Alexander S. ——
His Attorney.

Patented July 17, 1928.

1,677,715

UNITED STATES PATENT OFFICE.

WILLIAM N. GITTINGS, OF SPRINGFIELD, PENNSYLVANIA, ASSIGNOR TO GENERAL ELECTRIC COMPANY, A CORPORATION OF NEW YORK.

AUTOMATIC SWITCHING SYSTEM.

Application filed December 23, 1927. Serial No. 242,233.

My invention relates to automatic switching systems and particularly to automatic switching systems for controlling the automatic operation of a plurality of devices.

My invention is of particular utility in multiple unit automatic generating stations and automatic substations in which one unit is normally adapted to be placed in service automatically in response to a predetermined condition and another unit is automatically placed in service in place of said first unit when said first unit is inoperative or its associated automatic switching means fails to function properly.

One object of my invention is to provide an improved arrangement for placing a second unit of a multi-unit station in service upon the failure of a unit or the automatic switching means therefor to function properly.

My invention will be better understood from the following description, taken in connection with the accompanying drawing, and its scope will be pointed out in the appended claims.

In the accompanying drawing, I have shown diagrammatically a portion of an automatic switching arrangement for a three-unit automatic station embodying my invention. It will be obvious, however, that my invention is applicable to a multi-unit station having any number of units.

Referring to the drawing, 1 represents a load circuit which is normally supplied by a suitable source of current 2 and which is adapted to be supplied with current from three sources of current 3, 4 and 5. These sources of current 3, 4 and 5 are arranged to be connected to the load circuit 1 by means of suitable automatic switching means 6, 7 and 8 respectively. Each of the sources is also provided with any suitable regulating means, examples of which are well known in the art, for varying the output thereof in a predetermined manner. As shown these regulating means are manually controlled rheostats in the field circuits of the respective sources.

My invention is particularly applicable to multi-unit stations in which each unit is provided with automatic switching means for starting it from rest and for connecting it to the load circuit when the unit is in an operative condition to supply current thereto. Examples of such automatic switching means are well known in the art, and since the details thereof are immaterial so far as my invention is concerned, I have deemed it advisable, in order to simplify the disclosure, to show only such portions of the automatic switching means as are necessary for a clear understanding of the present invention. Therefore while in the present disclosure I have merely shown automatic switching means for connecting each unit to the load circuit, it is to be understood that such terminology also includes any suitable automatic switching means, examples of which are well known in the art, for starting the unit from rest and controlling its connection to the load circuit.

The automatic switching means 6 as shown comprises a suitable circuit breaker 9 for connecting the source 3 to the load circuit 1, a starting time relay 10 which when energized for a predetermined length of time effects the closing of the circuit breaker 9, a stopping time relay 11 which when energized a predetermined length of time effects the opening of the circuit breaker 9, and a load responsive relay 12 which is connected in any suitable manner so that it is energized in accordance with the current output of the source 3 and which is arranged to effect the energization of the stopping relay 11 so as to effect the opening of the circuit breaker 9 when the circuit breaker 9 is closed and the current output of the source 3 is below a predetermined value.

The automatic switching means 7 and 8 as shown respectively comprise suitable circuit breakers 13 and 14, starting time relays 15 and 16, stopping time relays 17 and 18, and load responsive relays 19 and 20 which are connected and arranged to cooperate in the same manner as the corresponding elements of the automatic switching means 6.

The automatic switching means 6, 7 and 8 are arranged to be controlled normally by suitable master control devices 22, 23 and 24 respectively. As shown in the drawing the control device 22 is a contact making voltmeter which is responsive to the voltage of the load circuit 1, and contact devices 23 and 24 are contact making ammeters which are respectively responsive to the current output of the sources 3 and 4. It is evident, however, that the master control elements 22, 23 and 24 may be any other suitable control devices either automatically or manually controlled, examples of which are well known in the art.

As shown the contact making voltmeter 22 normally is arranged to complete the circuit of the starting time relay 10 when the voltage of the load circuit is below a predetermined value so that if the load circuit voltage remains below this predetermined value for a predetermined time, the main control or starting circuit of the automatic switching means 6 is completed. This control circuit is so arranged that its energization effects the connection of the source 3 to the load circuit 1 and its deenergization effects the disconnection of the source 3 from the load circuit. The contact making voltmeter 22 also is arranged to close contacts in the circuit of the stopping time relay 11 so that time relay 11 can be energized to effect the deenergization of the main control circuit and the disconnection of the source 3 only when load circuit voltage is normal or above normal.

The contact making ammeter 23 normally is arranged to complete the circuit of the starting time relay 15 so as to effect the energization of the main control or starting circuit of the automatic switching means 7 when the source 3 is connected to the load circuit 1 and the current output thereof is above a predetermined value thereby indicating that the source 3 is overloaded and that another source should be connected to the load circuit to relieve the source 3 of a portion of its load. The energization of the main control circuit effects the connection of the source 4 to the load circuit 1. The contact making ammeter 23 normally is arranged also to complete the circuit of the stopping time relay 17 so as to prevent the deenergization of the main control circuit of the switching means 7 and the disconnection of the source 4 from the load circuit when both of the source 3 and 4 are supplying current to the load circuit and the current output of the source 3 is more than a predetermined value.

The contact making ammeter 24 normally is arranged to control the energization of the starting and stopping time relays 16 and 18 of the automatic switching means 8 in response to a predetermined current output of the source 4 so that the main control or starting circuit of the switching means 8 is energized and the source 5 is connected to the load circuit when the load is such that source 4 is overloaded, and the main control circuit is deenergized and the source 5 is disconnected from the load circuit when the load connected to the load circuit is such that the total load current can be supplied by two of the sources.

It will be observed that as shown the control devices 22, 23 and 24 operate normally so as to connect the sources 3, 4 and 5 successively to the load circuit in the order named and to disconnect them from the load circuit in the reverse order.

Each of the automatic switching means is provided with suitable protective devices, examples of which are well known in the art, which are arranged to operate in response to predetermined abnormal conditions of the automatic switching means and the associated source so as to prevent the switching means for effecting the connection of the associated source to the load circuit. Whenever any one of these protective devices operates to render its associated automatic switching means inoperative to place its source in service, it is desirable that another one of the automatic switching means should be placed under the control of the master control device which normally controls the inoperative switching means and source.

In accordance with the embodiment of my invention shown in the drawing, I accomplish this result by providing each automatic switching means, except the last to be operated in the predetermined sequence, with a relay which is arranged to operate whenever any one of its associated protective devices operates, to remove the control of the starting time relay of the associated switching means from the control of the master control element which normally controls its operation, and to place the starting and stopping time relays of the next automatic switching means in the predetermined sequence under the control of the master control element which normally controls the inoperative switching means. Emergency relay 26 is the energizing relay associated with the automatic switching means 6 which is arranged to remove the control of the starting relay 10 from the master element 22 and to place the starting relay 15 and stopping relay 17 under the control thereof when any of the protective devices associated with the automatic switching means 6 operates. As shown the circuit of the relay 26 is normally completed through contacts 27 which represent the contacts of the protective devices (not shown) associated with the source 3 and switching means 6. Whenever any of the contacts 27 are opened the relay 26 is deenergized and the proper transfer of the connections of the starting and stopping relays is effected to establish the desired connection.

Emergency relay 28 is associated with the automatic switching means 7 and its circuit includes contacts 29 of suitable protective devices (not shown) associated with the source 4 and automatic switching means 7. This relay 28 is arranged when deenergized to remove the starting relay 15 from the control of master element 23 and to place the starting relay 16 and stopping relay 18 of the automatic switching means 8 under the control of the master element 23.

Emergency relay 30 is associated with the automatic switching means 8 and its circuit includes contacts 31 of suitable protective devices (not shown) associated with the source 5 and the automatic switching means 8. Since the source 5 is the last source to be connected to the load circuit in the predetermined sequence, the relay 30 when deenergized merely removes the starting relay 16 from the control of the master element 24. If, however, there were other sources normally arranged to be connected automatically to the load circuit 1 after the connection of the source 5, relay 30 would be arranged to control the operation of the time relays of the next automatic switching means.

The operation of the arrangement shown is as follows: Under normal operating conditions of the sources 3, 4 and 5, the emergency relays 26, 28 and 30 are energized. When the relays 26, 28 and 30 are energized, the sources 3, 4 and 5 disconnected from the load circuit, and the voltage of the load circuit decreases so that the contact making voltmeter 22 engages its contacts 33, a circuit is completed for the starting time relay 10. This circuit is from one side of a suitable source of control current through contacts 33 of voltmeter 22, contacts 34 of relay 26, coil of relay 10 to the other side of the control source. If the load circuit voltage remains low for a predetermined time, the time relay 10 closes its contacts 35 in the control circuit for the automatic switching means 6. As shown the closing of contacts 35 completes the circuit for the closing coil 36 of the circuit breaker 9 so that the source 3 is connected to the load circuit 1. The circuit of the closing coil 36 is from one side of the control source through contacts 27 of the protective devices associated with source 3 and switching means 6, contacts 35 of relay 10, contacts 37 of stopping relay 11, closing coil 36 of circuit breaker 9 to the other side of the control source.

After the circuit breaker 9 closes the output of the source 3 is controlled in any suitable manner, examples of which are well known in the art, so that the voltage of the load circuit 1 is restored to normal. If the current output of the source 3 is above a predetermined small value after the circuit breaker 9 closes, current relay 12 opens its contacts 38 in the circuit of the stopping time relay 11 so that this time relay cannot be energized to effect the disconnection of the source 3 as long as the current output thereof is above this predetermined value. As soon as the voltage of the load circuit is restored to normal the voltmeter 22 moves out of engagement with its contacts 33 thereby opening the original energizing circuit for the time relay 10. The relay 10, however, remains energized due to a locking circuit it completes for itself from one side of the control circuit through contacts 27, contacts 35 of relay 10, contacts 37 of relay 11, auxiliary contact 32 on the switch 9, contacts 34 of relay 26, coil of relay 10 to the other side of the control circuit.

In the current output of the source 3 when connected to the load circuit 1 exceeds a predetermined value, contact making ammeter 23 engages its contacts 39 and completes a circuit for the starting time relay 15 of automatic switching means 7. This circuit is from one side of the control source through contacts 39 of the ammeter 23, contacts 40 of emergency relay 28, coil of time relay 15 to the other side of the control source. If the current output of the source 3 remains above the predetermined value for a predetermined time, relay 15 closes its contact 41 in the control circuit of the automatic switching means 7. As shown the closing of the contacts 41 completes the circuit for the closing coil 42 of the circuit breaker 13 so that the source 4 is connected to the load circuit. The circuit of the closing coil 42 is from one side of the control source, through contacts 29 of the protective devices associated with source 4 and switching means 6, contacts 41 of starting relay 15, contacts 43 of stopping time relay 17, closing coil 42 to the other side of the control source. After the completion of the control circuit the relay 15 is maintained energized independently of the contacts 39 by circuit from one side of the control source through contacts 29, contacts 41 of relay 15, contacts 43 of relay 17, auxiliary contacts 44 on circuit breaker 13, contacts 40 of relay 28, coil of relay 15, to the other side of the control source.

After the circuit breaker 13 closes the outputs of the sources 3 and 4 are controlled in any suitable manner so that the current output of the source 3 remains substantially constant at such a value that ammeter contacts 39 are open and the contacts 55 are closed and the output of source 4 is varied to take care of the variations in the load connected to the load circuit. If the current output of the source 4 is above a predetermined small value after the circuit breaker 13 closes, the current responsive relay 19 opens its contacts 45 in the circuit of the stopping time relay 17 so that this relay cannot be energized to effect the disconnection of the source 4 from the load circuit as long as current output of the source 4 is above this predetermined value.

When the load connected to the load circuit increases to such a value that the source 4 becomes overloaded, the contact making ammeter 24 which is responsive to the current output thereof engages its contacts 46 and thereby completes a circuit for the starting time relay 16 of the automatic switching means 8. This circuit is from one side of the control source through contacts 46 of ammeter 24, contacts 47 of relay 30, coil of time relay 16 to the other side of the control source. If the source 4 continues to supply the overload for a predetermined time, relay 16 closes its contacts 48 in the control circuit of the automatic switching means 8. As shown the closing of contacts 48 completes the circuit of the closing coil 49 of the circuit breaker 14 so that the source 5 is connected to the load circuit 1. The circuit of the closing coil 49 is from one side of the control source through contacts 31 of the protective devices associated with the source 5 and switching means 8, contacts 48 of relay 16, contacts 50 of stopping time relay 18, closing coil 49 of circuit breaker 14 to the other side of the control source. After the completion of the control circuit the relay 16 is maintained energized independently of the contacts 46 by a circuit from one side of the control source, through protective contacts 31, contacts 48 of relay 16, contacts 50 of relay 18, auxiliary contact 52 on the circuit breaker 14, contacts 47 of relay 30, coil of relay 16 to the other side of the control source.

After the source 5 is connected to the load circuit the outputs of the sources 3, 4 and 5 are controlled in any suitable manner so as to maintain the outputs of the sources 3 and 4 substantially constant at such values that the ammeter contacts 54 and 55 are closed and the ammeter contacts 39 and 46 are open, and the output of the source 5 is varied to take care of the variations in the load connected to the load circuit 1.

If the current output of the source 5 is above a predetermined value after the circuit breaker 14 closes, the current responsive relay 20 opens its contacts 53 in the circuit of the stopping time relay 18 so that this relay cannot be energized to effect the disconnection of the source 5 from the load circuit as long as the current output of the source 5 is above this predetermined value.

When the sources 3, 4 and 5 are connected to the load circuit and the load connected thereto decreases so that the current output of the source 5 decreases below a predetermined value, relay 20 closes its contacts 53 and completes a circuit for the stopping time relay 18. This circuit is from one side of the control source, through contact 54 of ammeter 24, which will be closed as the output of the source 4 is maintained at such a value when the source 5 is in operation that these contacts are closed, contacts 51 of relay 28, auxiliary contacts 56 on circuit breaker 14, contacts 53 of current relay 20, coil of stopping relay 18 to the other side of the control source. If the current output of source 5 remains below said predetermined value for a predetermined time, stopping relay 18 opens its contacts 50 in the heretofore traced control circuit for the switching means 8 so that the circuit breaker 14 is opened and the source 5 is disconnected from the load circuit.

The outputs of the sources 3 and 4 are then regulated so that the output of source 3 remains substantially constant at such a value that ammeter contacts 55 are closed and the output of source 4 is varied to take care of the variation in the load connected to the load circuit.

When under these conditions the current output of the source 4 decreases below a predetermined value current responsive relay 19 closes its contacts 45 and completes a circuit for the stopping time relay 17. This circuit is from one side of the control source through contacts 55 of ammeter 23, contacts 57 of relay 26, auxiliary contacts 58 of circuit breaker 13, contacts 45 of relay 19, coil of relay 17 to the other side of the control source. If the current output of the source 4 remains below the predetermined value for a predetermined time, stopping relay 17 opens its contacts 43 in the heretofore described control circuit for the automatic switching means 7 so that the circuit breaker 13 is opened and the source 4 is disconnected from the load circuit.

When the source 3 is connected to load circuit and the current output thereof decreases to such a value that the current responsive relay 12 closes its contacts 38 it thereby completes a circuit for the stopping time relay 11 if the load circuit voltage is normal so that the contact making voltmeter 22 is in engagement with its contacts 59. This circuit is from one side of the control source through contacts 59 of voltmeter 22, auxiliary contacts 60 on circuit breaker 9, contacts 38 of current relay 12, coil of stopping relay 11 to the other side of the control source. If the current output of the source 3 remains below said predetermined value for a predetermined time, stopping relay 11 opens its contacts 37 in the heretofore described control circuit for the automatic switching means 6 so that the circuit breaker 9 is opened and the source 3 is disconnected from the load circuit.

Heretofore it has been assumed that, whenever any one of the master control devices operated to effect the operation of the automatic switching means normally controlled thereby, said automatic switching means and the source associated therewith were in an operative condition so that the associated emergency relay is energized. Let it now be assumed that when the contact making voltmeter engages its contacts 33, the relay 26 is deenergized due to one of the protective contacts 27 being open. The engagement of the contacts 33 under these conditions immediately completes a circuit for the starting time relay 15 associated with switching means 7. This circuit of the relay 15 is from one side of the control source through contacts 33, contacts 63 of relay 26, contacts 40 of relay 28, coil of starting time relay 15 to the other side of the control source. The energization of the relay 15 then effects the connection of the source 4 to the load circuit in the manner heretofore described.

It will be observed that the closing of the contacts 33 does not complete the heretofore described circuit for the starting time relay 10 as this circuit is open at contacts 34 of the deenergized relay 26. Therefore, the relay 26, when deenergized, removes the starting time relay 10 from the control of the voltmeter 22 and places the starting time relay 15 of the next automatic switching means under the control of said voltmeter so that this time relay is immediately energized as soon as the voltmeter contacts 33 are engaged.

The relay 26 by opening its contacts 57, when deenergized, removes the control of the stopping time relay 17 of switching means 7 from the ammeter 23 which normally controls it and by closing its contacts 64 places the time relay 17 under control of the voltmeter 22 so that the time relay 17 can be energized to disconnect the source 4 from the load circuit only when the voltage of the load circuit is normal.

Similarly if the emergency relay 28 associated with the automatic switching means 7 is deenergized when the source 3 is in operation and the ammeter 23 engages its contacts 39, a circuit is immediately completed for the starting time relay 16 associated with automatic switching means 8 so that source 5 is connected to the load circuit in the manner heretofore described. This circuit of the time relay 16 is from one side of the control source, through contacts 39 of ammeter 23, contacts 65 of relay 28, contacts 47 of relay 30, coil of relay 16 to the other side of the control source.

It will be observed that the closing of the contacts 39 of the ammeter 23 under these conditions does not complete the heretofore described circuit of time relay 15 because this circuit is open at the contacts 40 of the deenergized relay 28. Therefore, the relay 28 when deenergized removes the starting time relay 15 from the control of the ammeter 23 and places the starting time relay 16 of the switching means 8 under the control of the ammeter 23.

The relay 28 by opening its contacts 57 when deenergized removes the control of the stopping time relay 18 of switching means 8 from the ammeter 24 which normally controls it and by closing its contacts 66 places the stopping time relay 18 under the control of the ammeter 23. The energizing circuit of the relay 18 when the contacts 66 are closed is from one side of the control source, through contacts 55 of ammeter 23, contacts 57 of relay 26, contacts 66 of relay 28, auxiliary contacts 56 of circuit breaker 14, contacts 53 of relay 20, coil of relay 18 to the other side of the control source.

When the emergency relay 30 is deenergized it merely opens the heretofore described circuit of the starting relay 16 as in the arrangement shown there is no other source which can be used in place thereof.

It will also be observed that, if both of the emergency relays 26 and 28 are deenergized when the voltmeter engages its contacts 33, the time relay 16 of the automatic switching means 8 is energized through contacts 63 of relay 26, contacts 65 of relay 28, and contacts 47 of relay 30 and the circuit of the stopping relay 18 is arranged to be closed through contacts 64 of relay 26 and contacts 66 of relay 28 when the voltmeter 22 is in engagement with contact 59.

Therefore, in accordance with the embodiment of my invention shown in the drawing when any emergency relay is deenergized the starting time relay of the associated switching means is immediately removed from the master control device which normally controls its operation and the starting time relay and the stopping time relay of the next operative automatic switching means are placed under the control of said master control device. Also the stopping time relay of said next operative automatic switching means is removed from the control of the master control element which normally controls its operation.

While I have shown the master control devices 22, 23 and 24 as being automatically controlled it is obvious that they may be manually controlled, in which case current responsive relays 12, 19 and 20 may be omitted. The connection and disconnection of each source normally would then depend entirely upon the position of the master control device controlling its operation and would be independent of the current outputs of the sources.

Furthermore it is to be understood that while I have shown the closing coils of the circuit breakers 9, 12 and 14 as being in the main control circuits of the associated automatic switching means in order to simplify the disclosure, in practice the closing and opening of the respective control circuit preferably effects the operation of other suitable switching means, examples of which are well known in the art, which in turn effects the opening and closing of the circuit breakers.

While I have in accordance with the patent statutes shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In combination, an electric circuit, a plurality of sources of current for supplying current to said electric circuit, switching means associated with each source for connecting it to said electric circuit, a main control circuit associated with each switching means, a time relay associated with each control circuit for effecting the energization thereof, a control device normally adapted to control the energization of one of said time relays so as to effect the energization of its associated control circuit, and means associated with the source with which said one of said time relays is associated and responsive to predetermined conditions of the associated source for removing said one of said time relays from the control of said control device and placing another of said time relays under the control of said control device.

2. In combination, an electric circuit, two sources of current, a main control circuit associated with each source, means in each control circuit for effecting the connection of the associated source to said electric circuit when the respective control circuit is energized, a time relay controlling the energization of each control circuit, a control device normally arranged when in a predetermined position to control the energization of one of said time relays so that it effects the energization of its associated control circuit after said control device has been in said predetermined position for a predetermined time, and means responsive to a predetermined abnormal condition of the source associated with said one of said time relays for removing said one of said time relays from the control of said control device and placing another of said time relays under the control of said control device.

3. In combination, a load circuit, a plurality of sources of current, automatic switching means associated with each source for controlling the connection thereof to said load circuit comprising a main control circuit, means responsive to the energization of said control circuit for effecting the operation of the switching means to effect the connection of the associated source to said circuit, and a time relay arranged when energized for a predetermined length of time to effect the energization of said control circuit; a control device normally arranged to control the energization of one of said time relays, and means responsive to a predetermined abnormal condition of the automatic switching means with which said one of said time relays is associated for removing said one of said time relays from the control of said control device and for placing another of said time relays under the control thereof.

4. In combination, a load circuit, a plurality of sources of current automatic switching means associated with each source for controlling the connection thereof to said load circuit comprising a main control circuit, means responsive to the energization of said control circuit for effecting the operation of the switching means to effect the connection of the associated source to said circuit, and a time relay arranged when energized for a predetermined length of time to effect the energization of the associated control circuit; a control device normally arranged when in a predetermined position to effect the completion of an energizing circuit for one of said time relays, and means responsive to predetermined abnormal conditions of the source and automatic switching means with which said one of said time relays is associated for preventing said control device when in said predetermined position from effecting the completion of the energizing circuit for said one of said time relays and for causing said control relay when in said predetermined position to effect the completion of an energizing circuit for another of said time relays.

5. In combination, a load circuit, a plurality of sources of current, automatic switching means associated with each source for controlling the connection thereof to said load circuit comprising a main control circuit, means responsive to the energization of said control circuit for effecting the connection of the associated source to said load circuit and responsive to the deenergization thereof for effecting the disconnection of the associated source from said load circuit, a starting time relay for controlling the completion of the control circuit, and a stopping time relay for controlling the opening of the control circuit; a control device normally arranged to control the energization of both of the time relays associated with one of the sources to effect the connection and disconnection thereof, a second control device normally arranged to control the energization of both of the time relays associated with another of said sources to effect the connection and disconnection thereof, and means responsive to a predetermined abnormal condition of said one of said sources for removing the control of the starting time relay associated therewith from under the control of said first mentioned control device and for placing the starting time relay of said other source under the control of said first mentioned control device and for removing the stopping time relay of said other source from under the control of said second control device.

6. In combination, a load circuit, a plurality of sources of current, automatic switching means associated with each source for controlling the connection thereof to said load circuit comprising a main control circuit, means responsive to the energization of said control circuit for effecting the connection of the associated source to said load circuit and a time relay arranged when energized a predetermined length of time to complete the control circuit; a plurality of control devices arranged to be operated in a predetermined sequence, each control device normally being arranged when in a predetermined position to complete an energizing circuit for a different time relay, and means associated with each source and responsive to a predetermined abnormal condition thereof for interrupting the energizing circuit of the associated time relay which is normally controlled by one of said control devices and for completing an energizing circuit for the time relay associated with the next control device in said predetermined sequence whose associated automatic switching means and source are in an operative condition.

7. In combination, a load circuit, a plurality of sources of current, automatic switching means associated with each source for controlling the connection thereof to said load circuit comprising a main control circuit, means responsive to the energization of said control circuit for effecting the connection of the associated source to said load circuit and responsive to the de-energization thereof for effecting the disconnection of the associated source from said load circuit, a starting time relay for controlling the completion of the control circuit, and a stopping time relay for controlling the opening of the control circuit, a plurality of control devices, each control device normally being arranged to control the energization of the time relays associated with a different source, and means responsive to a predetermined abnormal condition of one of said sources for removing the starting time relay of the associated switching means from the control of the control device normally controlling the operation thereof and for placing the time relays of another switching means under the control of said last mentioned control device and for removing the stopping time relay of said last mentioned switching means from the control of the control device which normally controls the operation thereof.

In witness whereof, I hereunto set my hand this twentieth day of December, 1927.

WILLIAM N. GITTINGS.